United States Patent

Shirodkar et al.

[11] Patent Number: 5,440,000
[45] Date of Patent: Aug. 8, 1995

[54] DISPERSANT/ANTIOXIDANT VII LUBRICANT ADDITIVE

[75] Inventors: Shailaja M. Shirodkar; Nicholas Benfaremo, both of Wappingers Falls; Rosemary J. Jennejahn, Nelsonville, all of N.Y.

[73] Assignee: Texaco Inc., White Plains, N.Y.

[21] Appl. No.: 276,503

[22] Filed: Jul. 18, 1994

Related U.S. Application Data

[63] Continuation of Ser. No. 37,698, Mar. 26, 1993, abandoned.

[51] Int. Cl.$^6$ .................................. C08F 226/02
[52] U.S. Cl. .................. 526/307.3; 526/307.5; 526/932
[58] Field of Search ............ 524/850; 526/312, 307.5, 526/307.3, 307.4, 932

[56] References Cited

U.S. PATENT DOCUMENTS 5,013,470  5/1991  Benfaremo ................... 252/47.5

*Primary Examiner*—Jeffrey T. Smith
*Attorney, Agent, or Firm*—George J. Darsa

[57] ABSTRACT

A dispersant/antioxidant bound, Viscosity Index-improving methacrylate polymer composition having a molecular weight ranging from about 20,000 to about 2,500,000. The composition comprises a base oil and methacrylate monomers and antioxidant monomer with inherent dispersancy. The composition being prepared by:

(a) mixing a antioxidant/dispersant monomer with alkyl methacrylates and an oil solvent to provide an intermediate reaction mixture;

(b) stirring and purging said reaction mixture by nitrogen ebullation for about 25-35 minutes at about 200 ml/min;

(c) heating said purged mixture to about 75°-85° C.;

(d) adding both a chain transfer agent and a radical polymerization catalyst to said heated mixture and then after about 2.0 hours adding an additional amount of said catalyst to said heated mixture, and then heating said heated mixture for an additional 2.0 hours;

(e) increasing the temperature of said heated mixture to about 95°-105° C. and maintaining said mixture at such temperature for a sufficient period of time to remove any excess of said polymerization catalyst; and (f) recovering the product methacrylate polymer.

5 Claims, No Drawings

DISPERSANT/ANTIOXIDANT VII LUBRICANT ADDITIVE

This is a continuation of application Ser. No. 08/037,698, filed on Mar. 26, 1993 now abandoned.

BACKGROUND OF THE INVENTION

This invention relates to Viscosity Index Improvers (VII), and more particularly to a dispersant/antioxidant Viscosity Index Improving polymethacrylate lubricant additive.

As is well known to those skilled in the art, lubricating oils for internal combustion engines typically contain a multitude of additives which function as detergents, dispersants, viscosity index improvers, pour depressants, etc., to improve the properties of the oil. It has also been found that it is particularly necessary to improve the resistance of a lubricating oil to oxidation.

In developing suitable additives for imparting various properties to lubricating oils, polymethacrylate (PMA) polymers have been found to be useful for a variety of applications in lubricants. Some of their chief uses are as Viscosity Index (VI) improvers and pour point depressants (PPD's) for lubricants. The preparation of functionalized PMA's has increased in recent years. Many functionalized PMA's contain some amine functionality for the purpose of imparting dispersancy to the polymer. Other functionalized PMA's are also known, but a lesser extent. There are, however, only a few examples of antioxidants being incorporated into the polymers. In developing PMA's which impart multifunctional properties to VII's and lubricants an adequate process has not been developed for synthesizing a multifunctional PMA, incorporating an amine type antioxidant.

Thus, it is an object of the present invention to provide a multifunctional antioxidant/dispersant containing a polymethacrylate (PMA) VI improver for use in accessory fluids or crankcase formulation in order to increase the stability and improve the performance of such products under high temperature engine operating conditions.

DISCLOSURE STATEMENT

U.S. Pat. No. 5,013,470 discloses an antioxidant and dispersant bound VII polymethacrylate lubricant additive composition prepared by:
  (a) combining an antioxidant monomer with dispersant dialkylamino methacrylate and ($C_1$-$C_{20}$) alkyl monomers in an oil solvent to provide an intermediate reaction mixture;
  (b) stirring and purging the reaction mixture by nitrogen ebullition for abut 25-35 minutes at about 200 ml/min;
  (c) reducing nitrogen ebullition to 15-25 ml/min and heating the purged mixture to about 70°-80° C.;
  (d) adding both a mercaptan and a radical polymerization catalyst to the heated mixture and then after about 2.0 hours adding an additional amount of the catalyst to said heated mixture, and then heating said heated mixture for an additional 2.0 hours;
  (e) increasing the temperature of the heated mixture to about 95°-105° C. and maintaining the mixture at such temperature for a sufficient period of time to remove any excess of the polymerization catalyst; and
  (f) removing the product polymethacrylate.

U.S. Pat. No. 4,036,766 discloses a complex reaction product of (1) an interpolymer of dialkylamino methacrylate, $C_{10}$-$C_{14}$ alkyl methacrylate and $C_{18}$-$C_{20}$ alkyl methacrylate monomers and (2) a liquid poly (alkene-1) of molecular weight between about 200 and 10,000 prepared by polymerizing the monomers comprising said interpolymer in the presence of said liquid poly (alkene-1). A mineral oil composition of improved viscosity pour depressing and detergent-dispersant properties and concentrates thereof comprising between about 10 and 95 wt. % of a mineral oil of a lubricating viscosity and between about 0.1 and 90 wt. % of said complex product.

U.S. Pat. No. 4,606,834 discloses lubricating oil compositions which contain a VI improving (VII) pour point depressant. The VII consists essentially of a terpolymer where the monomers are selected from various ($C_{10}$-$C_{20}$) alcohols and acrylates.

U.S. Pat. No. 4,098,709 discloses polymers containing post-reacted hindered phenol antioxidant functionality as viscosity index (VI) improvers for high temperature service, particularly for lubricating oils used in diesel engines.

Co-assigned U.S. patent application Ser. No. 172,664 discloses a reaction product of an ethylene copolymer or terpolymer of a ($C_3$-$C_{10}$) alphamonoolefin and optionally a non-conjugated diene or triene on which has been grafted an ethylenically unsaturated carboxylic function which is then further derivatized with an aminoaromatic polyamine compound.

SUMMARY STATEMENT

This invention provides a dispersant/antioxidant bound, Viscosity Index-improving polymethacrylate (methacrylate polymer) composition having a molecular weight ranging from about 20,000 to about 2,500,000 g/mole. The composition comprises a base oil and methacrylate monomers and an antioxidant monomer with inherent dispersancy. The composition is prepared by:
  (a) mixing a antioxidant/dispersant methacrylamide with alkyl methacrylates and an oil solvent to provide an intermediate reaction mixture;
  (b) stirring and purging said reaction mixture by nitrogen ebullation for about 25-35 minutes at about 200 ml/min;
  (c) heating said purged mixture to about 75°-85° C.;
  (d) adding both a chain transfer agent and a radical polymerization catalyst to said heated mixture and then after about 2.0 hours adding an additional amount of said catalyst to said heated mixture, and then heating said heated mixture for an additional 2.0 hours;
  (e) increasing the temperature of said heated mixture to about 95°-105° C. and maintaining said mixture at such temperature for a sufficient period of time to remove any excess of said polymerization catalyst; and
  (f) recovering the product methacrylate polymer.

The dispersant/antioxidant may be selected from the group consisting of an acrylate, a methacrylate, an acrylamide or a methacrylamide derived from acrylic of methacrylic acid or their derivatives, an aromatic alcohol, an amine and a phenol compound.

DETAILED DESCRIPTION OF THE INVENTION

The present invention resides in a dispersant/antioxidant bound, Viscosity Index Improving (VII) polymethacrylate composition (methacrylate polymer composition), i.e., lubricant additive, comprising an antioxidant monomer with inherent dispersancy.

According to the present invention, the methacrylate polymer composition (i.e.) lubricant additive is prepared by:

(a) mixing a dispersant/antioxidant monomer with alkyl methacrylates and an oil solvent to provide an intermediate reaction mixture;

(b) stirring and purging said reaction mixture by nitrogen ebullation for about 25-35 minutes at about 200 ml/min;

(c) heating said purged mixture to about 75°-85° C.;

(d) adding both a chain transfer agent and a radical polymerization catalyst to said heated and then after about 2.0 hours adding an additional amount of said catalyst to said heated mixture, and then heating said heated mixture for an additional 2.0 hours;

(e) increasing the temperature of said heated mixture to about 95°-105° C. and maintaining said mixtue at such temperature for a sufficient period of time to remove any excess of said polymerization catalyst; and (f) recovering the product poly methacrylate.

The dispersant/antioxidant monomer may be selected from the group consisting of an acrylate, a methacrylate, an acrylamide or a methacrylamide derived from acrylic of methacrylic acid or their derivatives, an aromatic alcohol, an amine and a phenol compound.

These VI improvers provide significant improvement in the oxidative stability of the polymer and impart dispersancy. This advance is achieved by incorporating an antioxidant/dispersant moiety in the polymer which renders the antioxidant soluble.

The polymer may be composed of any of the following polymerizable monomers:

a) a ($C_1$-$C_5$) alkyl methacrylate selected from the group consisting of methyl methacrylate, propyl methacrylate, butyl methacrylate and isopentyl methacrylate;

b) a ($C_{10}$-$C_{15}$) alkyl methacrylate selected from the group consisting of decyl methacrylate and undecyl methacrylate, dodecyl methacrylate, tridecyl methacrylate, tetradecyl methacrylate and pentadecyl methacrylate;

c) a ($C_{16}$-$C_{20}$) alkyl methacrylate selected from the group consisting of hexadecyl methacrylate, heptadecyl methacrylate, octadecyl methacrylate;

d) an alkyl methacrylate which contains an amine or phenol which may be any of the following amines (1-9) or phenols (10-14):

1) a amino phenothazine represented by the formula

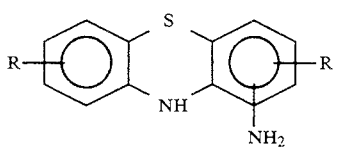

in which R is H or a ($C_1$-$C_{14}$) alkyl or alkenyl group;

2) an N-arylphenylenediamine represented by the formula

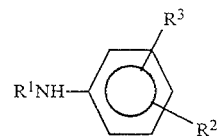

in which $R^1$ is a H, NHaryl, —NHarylalkyl, or a branched or straight chain ($C_1$-$C_{14}$) alkyl, alkenyl, alkoxyl, alkaryl, hydroxyalkyl or aminoalkyl group; $R^2$ is $NH_2$, $CH_2$—aryl—$NH_2$ or $CH_2$—$(CH_2)_n$—$NH_2$ in which n has a value of 1-10; and $R^3$ is a ($C_1$-$C_{14}$) alkyl, alkenyl, alkoxy, alkaryl, or arylalkyl group.

3) an aminothaizole selected from the group consisting of aminothazole, aminobenzothiazole, aminobenzothiadiazole and aminoalkylthaizole;

4) an aminocarbazole represented by the formula

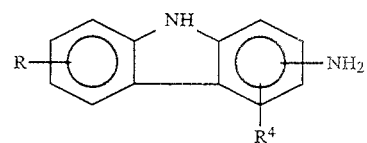

in which R and $R^4$ each are H or a ($C_1$-$C_{14}$) alkyl or alkenyl group, 5) an aminoindole represented by the formula

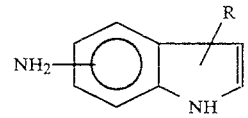

in which R is H or a ($C_1$-$C_{14}$) alkyl or alkenyl group;

6) an aminopyrrole represented by the formula

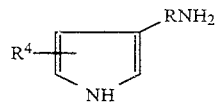

in which R and $R^4$ are each H or a ($C_1$-$C_{14}$) alkyl or alkenyl group;

7) an amino-indazoline represented by the formula

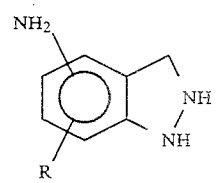

in which R is H or a ($C_1$-$C_{14}$) alkyl or alkenyl group;

8) an aminomercaptotriazole represented by the formula 9) an aminoperimidine represented by the formula

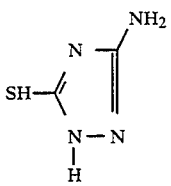

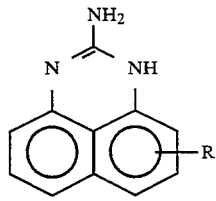

in which R is H or a ($C_1$-$C_{14}$) alkyl or alkenyl group;
10) a hydroxy diphenylamine represented by the formula

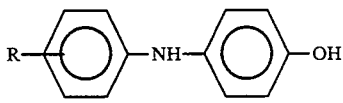

in which R is H or a ($C_1$-$C_{14}$) alkyl or alkenyl group;
11) a hydroxy phenothiazine represented by the formula

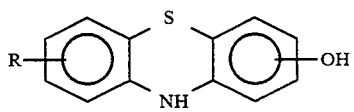

in which R is H or a ($C_1$-$C_{14}$) alkyl or alkenyl group;
12) a 2-(2-hydroxy)benzylphenol represented by the formula

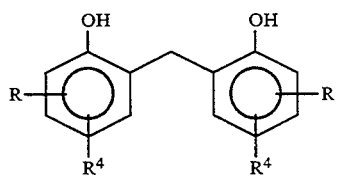

in which R and $R^4$ are each H or a ($C_1$-$C_{14}$) alkyl or alkenyl group;
13) a piperidin-4-ol represented by the formula

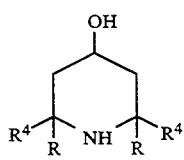

in which R and $R^4$ are each H or a ($C_1$-$C_{14}$) alkyl or alkenyl group; or
14) a substituted phenol represented by the formula

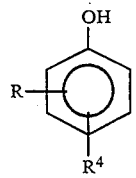

in which R and $R^4$ are each H or a ($C_1$-$C_{14}$) alkyl or alkenyl group.

Since the commercial alkyl methacrylates are often manufactured utilizing crude alcohol reactants containing a mixture of alcohols, when methacrylates is recited herein before and after it is intented to include unmixed and mixtures of alkyl methacrylates with the particular recited alkyl methacrylate predominating.

It is well known that antioxidants are readily removed from lubricants which come in contact with oils or are exposed to water or subjected to high temperatures during engine operation especially around seals or gaskets. According to the present invention, antioxidants are copolymerized with the polymeric backbone in the presence of tree radicals in solution. In this way, an amine type antioxidant is incorporated into the PMA which imparts antioxidancy as well as dispersancy. In addition, antioxidants being polar are relatively insoluble in non-polar oils, therefore polymerization of these moieties renders them soluble.

According to the present invention, the amine type antioxidant may be N-(4-anilinophenyl)methacrylamide which is a monomer that can be copolymerized in polymer backbones through the readily polymerizable methacrylamide group. This monomer which, hereinbelow, will be referred to as "1" is then rendered nonvolatile and non-extractable upon polymerization and is represented by the following formula

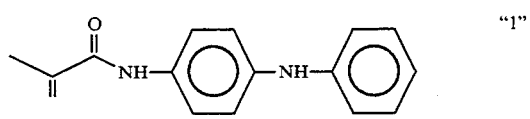

"1"

The monomers useful in the practice of this invention are polymerizable antioxidant methacrylamide "1", lauryl methacrylate (LMA), stearyl methacrylate (SMA) and butyl methacrylate (BMA) along with suitable catalysts which include peroxide type free radical catalysts such as benzoyl peroxide or catalysts such as 2,2'-azobisisobutyronitfile (AIBN). The component weight ratio of the monomers is 2-12% compound "1", LMA 82-72%, SMA 6% and BMA 10%. The copolymerization reaction is carried out at about 80° C. under inert atmosphere conditions when a catalyst such as AIBN is used. The chain terminating agents may typically be a $C_{12}$ mercaptans such as lauryl mercaptan. The polymerization solvent is typically an inert hydrocarbon lubricating oil. Diluent oil is added to the concentrate to make up a solution of 35-90% of concentrate.

The polymer product of the present invention is characterized by a molecular weight (Mn) of 20,000 to 250,000 g/mole and may be characterized by the formula:

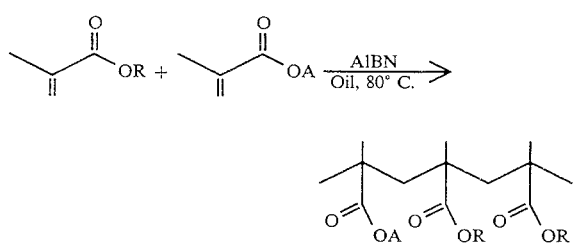

in which R is H or a ($C_1$-$C_{14}$) alkyl or alkenyl group and A is the antioxidant amine.

The process for the synthesis of methacrylamides involves reaction of amines with methylmethacrylates in the presence of a dibutyl tin catalyst followed by the removal of methanol and methylmethacrylate by distillation and purification of the product by crystallization.

The amines that may be used to prepare the methacrylamide may be any of the following:

1) a amino phenothazine represented by the formula

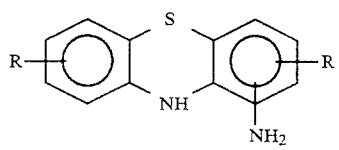

in which R is a H or ($C_1$-$C_{14}$) alkyl or alkenyl group;

2) an N-arylphenylenediamine represented by the formula

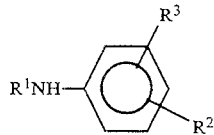

in which $R^1$ is a H, NHaryl, —NHarylalkyl, or a branched or straight chain ($C_1$-$C_{14}$) alkyl, alkenyl, alkoxyl, alkaryl, hydroxyalkyl or aminoalkyl group; $R^2$ is $NH_2$, $CH_2$—aryl—$NH_2$ or $CH_2$—$(CH_2)_n$—$NH_2$ in which n has a value of 1-10; and $R^3$ is a ($C_1$-$C_{14}$) alkyl, alkenyl, alkoxy, alkaryl, or arylalkyl group.

3) an aminothaizole selected from the group consisting of aminothazole, aminobenzothiazole, aminobenzothiadiazole and aminoalkylthaizole;

4) an aminocarbazole represented by the formula

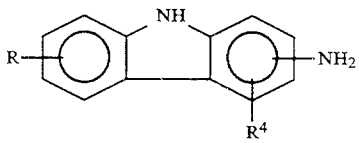

in which R and $R^4$ each are H or a ($C_1$-$C_{14}$) alkyl or alkenyl group, 5) an aminoindole represented by the formula

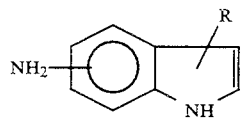

in which R is H or a ($C_1$-$C_{14}$) alkyl or alkenyl group;

6) an aminopyrrole represented by the formula

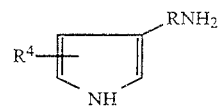

in which R and $R^4$ are each H or a ($C_1$-$C_{14}$) alkyl or alkenyl group;

7) an amino-indazoline represented by the formula

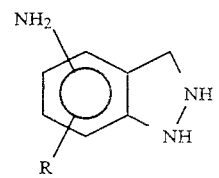

in which R is H or a ($C_1$-$C_{14}$) alkyl or alkenyl group;

8) an aminomercaptotriazole represented by the formula

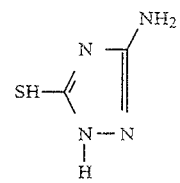

9) an aminoperimidine represented by the formula

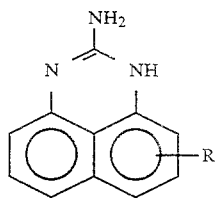

in which R is H or a ($C_1$-$C_{14}$) alkyl or alkenyl group.

The process for synthesis of antioxidant/dispersant methacrylates may involve reaction of the phenol with methacryloyl chloride in the presence of triethylamine, followed by crystallization of the product. The phenols that maybe used in the synthesis are:

1) a hydroxy diphenylamine represented by the formula

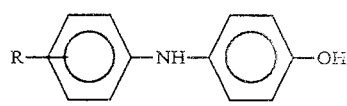

in which R is H or a ($C_1$-$C_{14}$) alkyl or alkenyl group;

2) a hydroxy phenothiazine represented by the formula

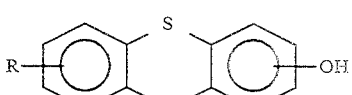

in which R is H or a ($C_1$-$C_{14}$) alkyl or alkenyl group;

3) a 2-(2-hydroxy)benzylphenol represented by the formula

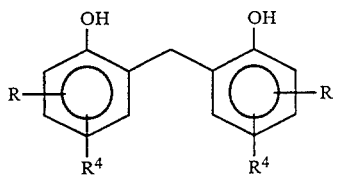

in which R and $R^4$ are each H or a ($C_1$-$C_{14}$) alkyl or alkenyl group;

4) a piperidin-4-ol represented by the formula

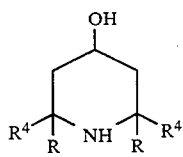

in which R and $R^4$ are each H or a ($C_1$-$C_{14}$) alkyl or alkenyl group; or 5) a substituted phenol represented by the formula

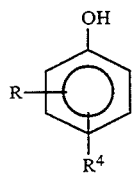

in which R and $R^4$ are each H or a ($C_1$-$C_{14}$) alkyl or alkenyl group.

In order to show the advantages of the present invention, the following Examples are provided.

EXAMPLE I

Preparation of a Dispersant-Antioxidant Methacrylate Polymer (DAOPMA) with 2% "1"

To a 2L resin kettle equipped with a condenser, thermocouple, thermometer and heavy duty stirrer was added antioxidant monomer N-(4-anilinophenyl)methacrylamide (16 g, 2%), butyl methacrylate (80 g, 10%), lauryl methacrylate (656 g, 82%), stearyl methacrylate (48 g, 6%) and polymerization oil 60P Pale oil (654 g). The reaction mixture was stirred and purged by nitrogen ebullition for 30 min at 200 Ml/min. The mixture was then heated to 80° C. by means of a heat lamp and 1-dodecanthiol (0.66 g) and azobisisobutyronitrile (AIBN) (1.00 g) were then added. The refractive index was monitored at regular intervals to obtain a stable refractive index. After 2 h, an additional amount of AIBN (0.20 g) was added and the reaction wits monitored for any increase in refractive index. If no further change was observed, the reaction temperature was increased to 100° C. and maintained for 1 h to destroy any excess AIBN. The product had a final concentration of 55wt. % in oil. An analysis of the product (L392-7632.00) is given below.

Nitrogen=0.14% (Calculated 0.12%)
Refractive Index=1.4681 (48° C.)

EXAMPLE II

Preparation of a Dispersant-Antioxidant Methacrylate Polymer (DAOPMA) with 4% "1"

To a 2L resin kettle equipped with a condenser, thermocouple, thermometer and heavy duty stirrer was added antioxidant monomer N-(4-anilinophenyl) methacrylamide (32 g, 4%), butyl methacrylate (80 g, 10%), lauryl methacrylate (640 g, 80%), stearyl methacrylate (48 g, 6%) and polymerization oil 60P Pale oil (654 g). The reaction mixture was stirred and purged by nitrogen ebullition for 30 rain at 200 Ml/min. The mixture was then heated to 80° C. by means of a heat lamp and 1-Dodecanthiol (0.66 g) and Azobisisobutyronitrile (AIBN) (1.00 g) were then added. The refractive index was monitored at regular intervals to obtain a stable refractive index. After 2 h, an additional amount of AIBN ( 0.20 g) was added and the reaction was monitored for any increase in refractive index. If no further change was observed, the reaction temperature was increased to 100° C. and maintained for 1 h to destroy any excess AIBN. The product had a final concentration of 55 wt. % in oil. An analysis of the product (L392-7633.00) is given below.

% Nitrogen=0.28% (calculated 0.24%)
Refractive Index=1.4707 (48° C.)

EXAMPLE III

Preparation of a Dispersant-Antioxidant Methacrylate Polymer (DAOPMA) with 8% "1"

To a 2L resin kettle equipped with a condenser, thermocouple, thermometer and heavy duty stirrer was added antioxidant monomer N-(4-anilinophenyl)methacrylamide "1" (64 g, 8%), butyl methacrylate (80 g, 10%), lauryl methacrylate (608 g, 78%), stearyl methacrylate (48 g, 6% ) and polymerization oil 60P Pale oil (654 g). The reaction mixture was stirred and purged by nitrogen ebullition for 30 min at 200 Ml/min. The mixture was then heated to 80° C. by means of a heat lamp and 1-Dodecanthiol (0.66 g) and Azobisisobutyronitrile (AIBN) (1.00 g) were then added. The refractive index was monitored at regular intervals to obtain a stable refractive index. After 2 h, an additional amount of AIBN (0.20 g) was added and the reaction was monitored for any increase in refractive index. If no further change was observed, the reaction temperature was increased to 100° C. and maintained for 1 h to destroy any excess AIBN. The product had a final concentration of 55wt. % in oil. An analysis of the product (L392-7634.00) is given below.

% Nitrogen=0.59% (calculated 0.48%)
Refractive Index=1.4745 (48° C.)

EXAMPLE IV

Preparation of a Dispersant-Antioxidant Methacrylate Polymer (DAOPMA) with 12% "1"

To a 2L resin kettle equipped with a condenser, thermocouple, thermometer and heavy duty stirrer was added antioxidant monomer N-(4-anilinophenyl)methacrylamide (72 g, 12%), butyl methacrylate (60 g, 10%), lauryl methacrylate (432 g, 72%), stearyl methacrylate (36 g, 6%) and polymerization oil 60P Pale oil (324 g). The reaction mixture was stirred and purged by nitrogen ebullition for 30 min at 200 Ml/min. The mixture was then heated to 80° C. by means of a heat lamp and 1-Dodecanthiol (0.50 g) and Azobisisobutyronitrile (AIBN) (0.75 g) were then added. The refractive index was monitored at regular intervals to obtain a stable refractive index. After 2 h, an additional amount of AIBN (0.20 g) was added and the reaction was monitored for any increase in refractive index. If no further change was observed, the reaction temperature was increased to 100° C. and maintained for 1 h to destroy any excess AIBN. The product had a final concentration of 65wt. % in oil. An analysis of the product (L392-7601.00) is given in below.

% Nitrogen=1.05 (calculated 0.86%)
Refractive Index=1.4818 (48° C.)

EXAMPLE V

Preparation of a Dispersant-Antioxidant Methacrylate Polymer (DAOPMA) with 4% "1"/4% N-Vinyl Pyrrolidinone To a 2L resin kettle equipped with a condenser, thermocouple, thermometer and heavy duty stirrer was added antioxidant monomer N-(4-anilinophenyl)methacrylamide (8 g, 4%), butyl methacrylate (20 g, 10%), lauryl methacrylate (152 g, 76%), stearyl methacrylate (12 g, 6%), n-vinyl pyrrolidinone (8.00, 4%) and polymerization oil 60P Pale oil (86 g). The reaction mixture was stirred and purged by nitrogen ebullition for 30 min at 200 mL/min. The mixture was then heated to 80° C. by means of a heat lamp and 1-Dodecanthiol (0.20 g) and Azobisisobutyronitrile (AIBN) (0.25 g) were then added. The refractive index was monitored at regular intervals to obtain a stable refractive index. After 2 h, an additional amount of AIBN (0.20 g) was added and the reaction was monitored for any increase in refractive index. If no further change was observed, the reaction temperature was increased to 100° C. and maintained for 1 h to destroy any excess AIBN. The product had a final concentration of 50wt. % in oil. An analysis of the product (L391-7528.00) is given in below.

Refractive Index=1.4692 (48° C.)

The dispersant antioxidant methacrylate polymer (DAOPMAs) (PMAs 11 to VI) were evaluated for thermal and oxidative stability, dispersancy and other viscometric properties along with a commercial PMA I and PMA VII prepared from literature (U.S. Pat. No. 5,013,468). The results are intended to show that PMAs containing. "1" are capable of providing the PMA with antioxidancy as well as dispersancy properties while maintaining all the desired viscometric properties. This is of special significance because it is accomplished without incorporating a dispersant monomer such as Dimethylaminopropyl methacrylaminde (DMAP-MAD) to provide dispersancy properties.

The following procedures and tables of results thereof are provided below to evaluate the present polymers.

EVALUATION OF THERMAL AND OXIDATIVE STABILITIES OF POLYMERS

Precipitation of Polymer

The DAOPMA (5 g) was dissolved in heptane (20 mL) over a steam plate at 90° C. The solution was slowly poured into a stirred solution of MeOH (200 mL) to yield the precipitated polymer precipitate. The precipitate was redissolved (25 wt. % in heptane) and the precipitation was repeated two to three times to ensure removal of impurities.

Pressure Differential Scanning Calorimetry (PDSC)

The oxidative stabilities of precipitated methacrylate polymers with varying amounts of "1" were determined using pressure differential scanning calorimetry (PDSC) with a 9900 DuPont Thermal Analysis System and differential scanning calorimeter, using aluminum pans under 500 psig (3.4 mpa) oxygen pressure and a purge rate of 50 mL/min. Two thermal methods were used to run the samples. In Method 1, the instrument was programmed to raise the temperature of the sample at a rate of 10° C./min until the sample oxidized and the temperature was measured in °C. In Method 2 the sample was oxidized under isothermal conditions at 180° C. or 230° C. depending on the stability results of the first method and the oxidative induction time (OIT) required (rain) for sample decomposition was measured. In both cases, the major oxidation exotherm curve was extrapolated tangentially at the point of maximum slope and the intercept with the temperature or time coordinate was recorded.

The results of the Pressure Differential Scanning Calorimetry (PDSC) on the AOPMA polymers containing varying amounts of "1" are shown below in Table 1. This data shows clearly that polymers containing increasing amounts of "1" from 2% to 12% (PMAs II to V) possess significantly higher oxidation stabilities than the parent PMAs I and VII. Similar results are obtained using isothermal method. The isothermal temperature chosen for PMAs II to V and VII was 230° C., 50° C. higher than that used for the standard I because these polymers were very stable at 180° C. At the decomposition temperature of 230° C., with an increasing amount of "1", the oxidative induction time (OIT) required for decomposition increases in comparison to the standards I and VII.

Thermogravimetric Analysis (TGA)

The thermal stability of the precipitated polymers in air was determined by Thermogravimetric analysis (TGA) on a Mettler Thermal Analysis system thermogravimetric analyzer using aluminum oxide pans under a compressed air atmosphere. The temperature was raised at a rate of 40° C. min$^{-1}$ with a gas flow rate of 200 cc min$^{-1}$. The temperature for 5 and 50 wt. % loss and residue remaining was recorded.

The temperature at which 5 wt. % loss was observed ($T_{5 \, wt. \%}$), 50 wt. % loss ($T_{50 \, wt. \%}$) and wt. % residue remaining at 400° C. are reported below in Table I. The results for parent PMAs I and VII and the experimental PMAs II to VI indicate that the thermal stability of the parent and experimental polymers is equivalent.

TABLE I

Oxidative And Thermal Stability Test Results

| PMA | % Antioxidant "1" | PDSC Decomposition Temp. (°C.) | PDSC Oxidative Onset Temp. (min) | TGA (Air) $T_{5wt\%}$ Loss (°C.) | TGA (Air) $T_{50wt\%}$ Loss (°C.) | Residue[5] (wt %) |
|---|---|---|---|---|---|---|
| I | 0% | 239.6 | 35.1[1] | 256 | 343 | 2.5 |
| II | 2% | 262.3 | 21.3[3] | 280 | 321 | 2.5 |
| III | 4% | 268.6 | 46.6[2] | 278 | 329 | 2.5 |
| IV | 8% | 279.6 | 79.0[2] | 275 | 324 | 2.5 |
| V | 12% | 285.6 | 119[2] | 278 | 337 | 5.0 |
| VI | 4% "1"; 4% NVP[3] | — | — | 296 | 346 | 5.0 |
| VII | 4% "1"; 4% DMAPMAD[4] | 275.6 | 51.3[2] | 312 | 369 | 5.0 |

[1] 180° C.
[2] 230° C.
[3] N-vinylpyrrolidone
[4] Dimethylaminopropyl methacrylamide
[5] At 400° C.

EVALUATION OF ANTIOXIDANT PROPERTIES IN SOLUTION

Bench Oxidation Test

The BOT was used to evaluate the oxidative stability of the PMAs in oil. It was conducted in a 2L, 4-necked resin kettle equipped with a thermometer, condenser, gas bubbling tube and a mechanical stirrer. The polymer (3.75 wt. % of a 40 wt. % concentrate) was added along with 1235 g of SNO-130 oil which comprises of 60% SNO-150 and 40% SNO-100. The reaction mixture was then heated to 150° C. and initial samples were taken (0 h sample). The oxidation was started by switching from nitrogen purge to one of air at a rate of 500 mL/min. The stirring rate was kept between 675 and 700 rpms. Samples were taken periodically using a syringe and evacuated test tubes. They were then quickly stored in the refrigerator to retard further oxidation. The test was run under these conditions for 144 h. BOT DIR (differential infra-red) values were obtained by a Differential Infrared technique (DIR) in which the carbonyl absorption band at 1710 cm$^{-1}$ of the zero hour sample was subtracted from that of the final product.

The relative ratio in the increase of the carbonyl absorption band at 1710 cm$^{-1}$ of the oxidized oil containing AOPMAs, over that of the starting material are tabulated in Table 2. The base oil used in the test, SNO-130 gave a DIR of approximately 7, so values less than 7 are considered indicative of antioxidant properties. Lower DIR values are representative of increasingly better antioxidant behavior. As the amount of "1" increased from 2% to 12% in PMAs II to V, the DIR values continued to decrease, unlike parent PMA I. PMAs VI and VII also showed antioxidancy potential.

Thin-Film Oxygen Uptake Test (TFOUT) ASTM #D 4742-88

This test method is one of the several tests used to evaluate the oxidation stability of engine oils for gasoline automotive engines. A bomb containing metal catalyst, fuel catalyst and water is pressurized with oxygen and heated to 160° C. These conditions partially simulate those that an oil is subjected in a gasoline combustion engine. The test measures oxidation induction time i.e. time at which the oil begins to oxidize rapidly as measured by the oxygen being absorbed by the oil during the oxidation process. The 5W-30 motor oil formulation used in testing contains 7.22 wt. % of experimental PMA. The ATF formulation contains 5 wt. % of experimental PMA. The results for the TFOUT test in Table II, below, show that as the dosage of antioxidant monomer was increased from from 2% to 12% in PMAs II to I, the induction time increased thereby indicating greater oxidative stability of the fluid. This result was corroborated with the BOT test wherein DIR values continue to decrease as the dosage of the antioxidant monomer is increased. PMAs VI and VII showed antioxidancy behavior consistent with that containing 4% "1" (PMA III) in motor oils. However in ATF formulation, PMA VII performed poorly.

TABLE II

Bench Oxidation tests

| PMA | % Antioxidant "1" | TFOUT (Motor oil) (min) | TFOUT (ATF) (min) | BOT |
|---|---|---|---|---|
| I | 0% | 239 | 118 | 24.8 |
| II | 2% | 238 | 124 | 14.62 |
| III | 4% | 258 | 147 | 5.97 |
| IV | 8% | 314 | 212 | 2.41 |
| V | 12% | 446 | 280 | 1.63 |
| VI | 4% "1"; 4% NVP | 279 | 74 | 1.47 |
| VII | 4% "1"; 4% DMAPMAD | 288 | 153 | 3.41 |

Evaluation of Dispersancy Properties

The dispersancy of the additives was determined in the Bench Sludge Test (BST) which measures the ability of a dispersant to solubilize particles in the oil through a turbidity index. This test is conducted by heating the test oil mixed with a synthetic hydrocarbon blowby and a diluent oil at a fixed temperature for a fixed time period. After heating, the turbidity of the resulting mixture is measured. A low percentage turbidity is indicative of good dispersancy (30–35) while an intermediate value (40–50) indicates average dispersancy and a high value (85–95) indicates an increasingly poor dispersancy. The additives were tested at a 9.5 wt. % treating dosage in an SAE 5W-30 formulation and compared to good, fair and poor references as provided. The additives were tested at a 9.5 wt. % treating dosage in an SAE 5W-30 formulation and compared to good, fair and poor references as provided below in Table III.

The turbidity index for formulation containing the experimental AOPMA was compared to good, fair and poor and SG reference oils to access its dispersancy property. A low percentage turbidity is indicative of good dispersancy (30–35) while an intermediate value (40–50) indicates average dispersancy and a high value (85–95) indicates an increasingly poor dispersancy. As shown below in Table III, as the dosage of antioxidant monomer is increased, the dispersancy of the AOPMA increases (PMA II to V). It compared well with PMA I and PMAs VI and VII since these methacrylate polymers contain dispersant monomers which lend dispersancy properties. Therefore, the monomer "1" is capable of contributing both antioxidant and dispersancy properties to the PMA.

TABLE III

| | Bench Sludge Test Results | | | | | |
|---|---|---|---|---|---|---|
| Example | % Antioxidant "1" | AOPMA | SG | Good | Fair | Poor |
| I | 0% | 30 | 41 | 37 | 41 | 67 |
| II | 2% | 48 | 41 | 37 | 41 | 67 |
| III | 4% | 34 | 40 | 36 | 50 | 72 |
| IV | 8% | 35 | 40 | 36 | 50 | 72 |
| V | 12% | 32 | 33 | 33 | 53 | 91 |
| VI | 4% "1"; 4% NVP | 28 | 40 | 36 | 43 | 76 |
| VII | 4% "1"; 4% DMAPMAD | 31 | 40 | 36 | 43 | 76 |

EVALUATION OF SOLUTION PROPERTIES

Brookfield Viscosity, ASTM D 2983-87

This test measures the low temperature low shear rate viscosity (cP) of automotive fluid lubricants in the temperature range of −5° to −40° C. ATF blends containing 5 wt. % of VIIs were tested in this test. Brookfield viscosity of 20,000 max were desired.

Kurt Orbahn Shear Stability, ASTM D-3945

This test determines the ability of the oil to retain its viscosity under high shear stress conditions. The polymer molecules break down under these conditions and loose their thickening power. Therefore, the oil is subjected to shearing conditions and then the kinematic viscosity is measured in comparison to the initial viscosity. Shear stability index (SSI) is measured as a percentage:
SSI = {(Initial Vis.—Vis after shearing)/(Initial Vis.—Vis. of base blend)} X 100. ATF formulations containing 5 wt. % of VIIs were tested in this test.

Kinematic Viscosity: ASTM D 445-88

This test determines the kinematic viscosity of liquid petroleum products by measuring the time for a volume of liquid to flow under gravity through a calibrated glass capillary viscometer.

Molecular Weight Determination

The samples were chromatographed by gel permeation chromatography on a Water 590. with a Waters WISP 710B autosampler and Waters 410 type refractive index detector. The GPC column set consisted of a Phenogel 5 micron (300×7.8 mm ID) column with poresizes of 106, 104, 1000, 500 Anstroms with THF as the mobile phase at 40° C. and calibrated with PMA standards from 3400 to 2.2 million g/moles. The results from the evaluation of solution properties are listed below in Table IV.

The kinematic viscosity dam show that as the dosage of 1 increases, the kinematic viscosity decreases for PMAs II to V in comparison to parent PMA I. This could be occuring due to increasing polarity of the polymer and therefore the increasing polarity difference between the polar AOPMA and apolar solvent, oil. The low temperature low shear rate viscosity (cP) as measured by the Brookfield viscosity was less than 20,000 cP for all PMAs except V, as was desired. The Kurt Orbahn test which measures the shear stability index or the ability of the PMA to withstand high shear stress conditions indicated that as the dosage of "1" increased, the desired lowering of SII was observed. The average number molecular weight (Mn) and polydispersity of the PMAs II to V remained similar to parent PMA I except PMA VI which had a high mol. wt.

TABLE IV

| | | Solution Properties | | | | | |
|---|---|---|---|---|---|---|---|
| PMA | % Antioxidant "1" | Kin. Vis (100° C.) | Brookfield Viscosity (−40° C.) | Shear stability Index | Molecular Weight | | |
| | | | | | Mw | Mn | $P_d$ |
| I | 0% | 8.55 | 16,000 | 51 | 147,000 | 50,000 | 2.9 |
| II | 2% | 7.03 | 19,000 | 21 | 202,000 | 77,000 | 2.6 |
| III | 4% | 7.31 | 17,000 | 22 | 218,000 | 79,000 | 2.8 |
| IV | 8% | 6.35 | 17,000 | 12 | 170,000 | 67,000 | 2.6 |
| V | 12% | 6.20 | 20,300 | 9 | 210,000 | 72,000 | 2.9 |
| VI | 4% "1"; 4% NVP | 9.75 | 18,200 | 50 | 307,000 | 110,000 | 2.8 |
| VII | 4% "1"; 4% DMAPMAD | 7.08 | 19,400 | 20 | 147,000 | 51,000 | 2.9 |

CONCLUSIONS

These results clearly show that PMAs containing "1" (PMAs II to V) show:
1) Superior oxidative stability based on Pressure differential scanning calorimetry results and equivalent thermal stability to commercial PMA I. These properties are also incorporated into the formualations containing these PMAs such as the TFOUT and BOT tests;
2) Dispersancy properties equivalent to commercial PMA without having to incorporate a dispersant monomer; and
3) Excellent low temperature properties such as Brookfield viscosity (<20,000cP), good shear stability index (10–35) and kinematic viscosity (>7.0).

Based on these results, DAOPMA containing 4% "1" would be the most suitable choice for commercialization.

We claim:

1. A dispersant/antioxidant, viscosity index improving methacrylate polymer composition, having a molecular weight ranging from about 20,000 to about 250,000, said composition comprising a base oil and effective amounts of antioxidant monomers, said composition being prepared by:

(a) mixing a antioxidant/dispersant methacrylamide with alkyl methacrylates and an oil solvent to provide an intermediate reaction mixture;

(b) stirring and purging said reaction mixture by nitrogen ebullition for about 25-35 minutes at about 200 ml/min;

(c) heating said purged mixture to about 75°-85° C.;

(d) adding both a chain transfer agent and a radical polymerization catalyst to said heated mixture and then after about 2.0 hours adding an additional amount of said catalyst to said heated mixture, and then heating said heated mixture for an additional 2.0 hours;

(e) increasing the temperature of said heated mixture to abut 95°-105° C. and maintaining said mixture at such temperature for a sufficient period of time to remove any excess of said polymerization catalyst; and (f) recovering the product methacrylate polymer;

wherein the methacrylate polymer comprises polymerized monomers of:

a) a ($C_1$-$C_5$) alkyl methacrylate selected from the group consisting of methyl methacrylate, propyl methacrylate, butyl methacrylate and isopentyl methacrylate;

b) a ($C_{10}$-$C_{15}$) alkyl methacrylate selected from the group consisting of decyl methacrylate and undecyl methacrylate, dodecyl methacrylate, tridecyl methacrylate, tetradecyl methacrylate and pentadecyl methacrylate;

c) a ($C_{16}$-$C_{20}$) alkyl methacrylate selected from the group consisting of hexadecyl methacrylate, heptadecyl methacrylate, octadecyl methacrylate; and d) an alkyl methacrylate which contains an amine or phenol.

2. The alkyl methacrylates of claim 1 wherein said amine is selected from the group consisting of:

a) a amino phenothazine represented by the formula

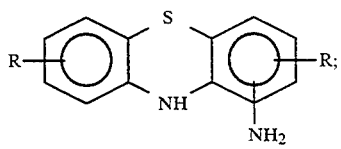

b) an N-arylphenylenediamine represented by the formula

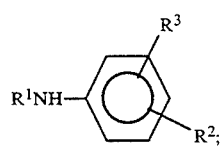

c) an aminothaizole selected from the group consisting of aminothazole, aminobenzothiazole, aminobenzothiadiazole and aminoalkylthaizole;

d) an aminocarbazole represented by the formula

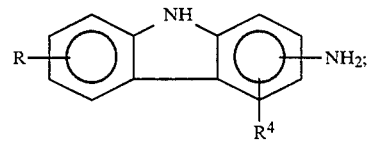

e) an aminoindole represented by the formula

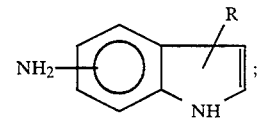

f) an aminopyrrole represented by the formula

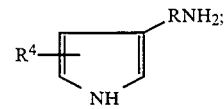

g) an amino-indazoline represented by the formula

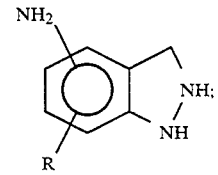

h) an aminomercaptotriazole represented by the formula

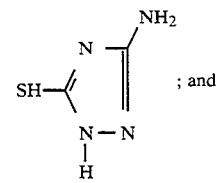

; and i) an aminoperimidine represented by the formula

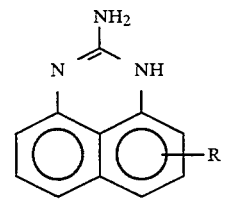

wherein the above formulas R and $R^4$ are each H or a ($C_1$-$C_{14}$) alkyl or alkenyl group; $R^1$ is a H, NHaryl, -NHarylalkyl, or a branched or straight chain ($C_1$-$C_{14}$) alkyl, alkenyl, alkoxyl, alkaryl, hydroxyalkyl or aminoalkyl group; $R^2$ is $NH_2$, $CH_2$-aryl-$NH_2$ or $CH_2$—($CH_2$)$_n$—$NH_2$ in which n has a value of 1-10; and $R^3$ is a ($C_1$-$C_{14}$) alkyl, alkenyl, alkoxy, alkaryl, or arylalkyl group.

3. The alkyl methacrylates of claim 1 wherein said phenol is selected from the group consisting of:

a) a hydroxy diphenylamine represented by the formula

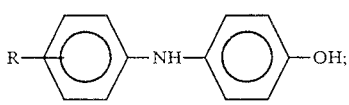

b) a hydroxy phenothiazine represented by the formula

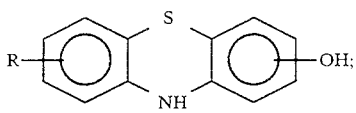

c) a 2-(2-hydroxy)benzylphenol represented by the formula

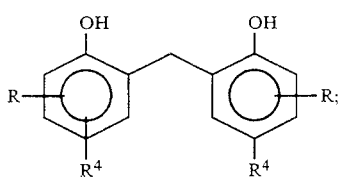

d) a piperidin-4-ol represented by the formula

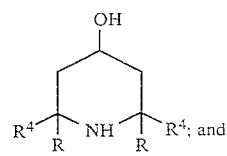

e) a substituted phenol represented by the formula

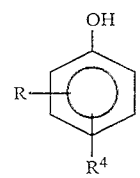

wherein the above formulas R and $R^4$ are each H or a ($C_1$-$C_{14}$) alkyl or alkenyl group.

4. The dispersant/antioxidant methacrylate polymer composition of claim 1, wherein the methacrylamide is N-(4anilinophenyl) methacrylamide.

5. The dispersant/antioxidant methacrylate polymer composition of claim 1, wherein the methacrylate polymer comprises polymerized monomers of (a) butyl methacrylate; (b) lauryl methacrylate; (c) stearyl methacrylate; and (d) N-(anilinophenyl)methacrylamide.

* * * * *